(12) United States Patent
Wang (10) Patent No.: US 11,379,673 B2
(45) Date of Patent: Jul. 5, 2022

(54) ANALOG VECTOR-MATRIX MULTIPLICATION CIRCUIT

(71) Applicant: BEIJING ZHICUN (WITIN) TECHNOLOGY CORPORATION LIMITED, Beijing (CN)

(72) Inventor: Shaodi Wang, Beijing (CN)

(73) Assignee: BEIJING ZHICUN WITIN TECHNOLOGY CORPORATION LIMITED, Beijing (CN)

( * ) Notice: Subject to any disclaimer, the term of this patent is extended or adjusted under 35 U.S.C. 154(b) by 0 days.

(21) Appl. No.: 17/163,617

(22) Filed: Feb. 1, 2021

(65) Prior Publication Data

US 2021/0365646 A1 Nov. 25, 2021

Related U.S. Application Data

(63) Continuation of application No. PCT/CN2019/081342, filed on Apr. 3, 2019.

(30) Foreign Application Priority Data

Aug. 2, 2018 (CN) .......................... 201810872120.9

(51) Int. Cl.
*G06G 7/16* (2006.01)
(52) U.S. Cl.
CPC ...................... *G06G 7/16* (2013.01)
(58) Field of Classification Search
CPC ............ G06N 3/04; G06N 3/063; G06N 3/08; G06G 7/16; G06F 7/44; G06F 7/443;
(Continued)

(56) References Cited

U.S. PATENT DOCUMENTS 10,452,472 B1 * 10/2019 Graves .................. H03M 13/35
2007/0007999 A1 * 1/2007 Graham ............. G11C 16/0416
326/38

(Continued)

FOREIGN PATENT DOCUMENTS

CN 106843809 A 6/2017
CN 108053029 A 5/2018

(Continued)

*Primary Examiner* — Matthew D Sandifer
*Assistant Examiner* — Huy Duong (57) ABSTRACT

An analog vector-matrix multiplication circuit is achieved by using a programmable storage device array. In a programmable semiconductor device array, gates of all of programmable semiconductor devices of each row are all connected to the same analog voltage input end. M rows of programmable semiconductor devices are correspondingly connected to M analog voltage input ends. Drains (or sources) of all of programmable semiconductor devices of each column are all connected to the same bias voltage input end. N columns of programmable semiconductor devices are correspondingly connected to N bias voltage input ends. Sources (or drains) of all of programmable semiconductor devices of each column are all connected to the same analog current output end. The N columns of programmable semiconductor devices are correspondingly connected to N analog current output ends. Threshold voltages of the programmable semiconductor devices are controlled, such that each programmable semiconductor device can be regarded as a variable equivalent analog weight, thereby achieving the matrix multiplication function.

13 Claims, 6 Drawing Sheets

(58) Field of Classification Search
CPC .... G06F 15/7821; G06F 15/785; G06F 17/16; G11C 2013/0045; G11C 2013/0078
See application file for complete search history.

(56) References Cited

U.S. PATENT DOCUMENTS

| | | | |
|---|---|---|---|
| 2007/0133303 A1* | 6/2007 | Mawatari | G11C 16/26 365/185.23 |
| 2017/0277659 A1 | 9/2017 | Akerib et al. | |
| 2018/0321942 A1* | 11/2018 | Yu | G11C 13/003 |
| 2019/0066780 A1* | 2/2019 | Hu | G11C 11/56 |
| 2019/0205741 A1* | 7/2019 | Gupta | G06F 9/3877 |
| 2019/0370639 A1* | 12/2019 | Yu | G11C 11/54 |
| 2021/0019609 A1* | 1/2021 | Strukov | G06N 3/049 |

FOREIGN PATENT DOCUMENTS

| | | |
|---|---|---|
| CN | 108763163 A | 11/2018 |
| CN | 108777155 A | 11/2018 |
| CN | 109086249 A | 12/2018 |
| CN | 109273035 A | 1/2019 |
| CN | 208507187 U | 2/2019 |
| CN | 208547942 U | 2/2019 |
| CN | 208569628 U | 3/2019 |

\* cited by examiner

ANALOG VECTOR-MATRIX MULTIPLICATION CIRCUIT

CROSS REFERENCE TO RELATED APPLICATION

This application claims the priority of a Chinese patent application filed with the Chinese Patent Office on Aug. 2, 2018, with an application number of 201810872120.9 and an application titled "ANALOG VECTOR-MATRIX MULTIPLICATION OPERATION CIRCUIT", the entire content of which is incorporated into this application by reference.

BACKGROUND

The invention relates to the field of signal processing, in particular to an analog vector-matrix multiplication circuit.

Matrix multiplication is widely used in data mining fields such as image processing, recommendation systems, data dimensional reduction, etc. However, the traditional technical architecture and the serial-based approach of relying on a single computer are less and more unsuitable for the current requirements of massive data processing. Therefore, expanding the calculation scale of matrix multiplication and reducing its calculation time will help meet the requirements of matrix factorization algorithms for processing large-scale data. However, matrix multiplication has high time complexity, and traditional matrix multiplication solves the matrix product by finding the inner product of the left matrix row and the right matrix column. This algorithm can be implemented as a distributed algorithm, but its performance is not optimistic. Another form of matrix multiplication is to perform the outer product operation on the columns of the left matrix and the corresponding rows of the right matrix to obtain partial results of the result matrix, and finally sum up the partial results. Although in terms of parallelization, this algorithm has greatly improved efficiency compared with traditional algorithms But there are also certain bottlenecks. When the matrix scale is very large, so large that the memory of a single machine cannot store a row of the left matrix and a column of the right matrix, it cannot be calculated.

Vector-matrix multiplication is a commonly used logic calculation function. In the traditional von Neumann computing architecture, the memory and the processor are physically separated, and the two are connected through a data bus. When performing a vector-matrix multiplication operation, you first need to read the vector and matrix data to be processed from the memory, transfer it to the processor, perform logical calculations, and then store the calculation results back into the memory. This calculation method consumes a large amount of data bus bandwidth and trans-mission power consumption. The vector-matrix multiplication of analog signals is more complicated. Firstly, the analog signal needs to be converted into a digital signal through methods such as analog-to-digital conversion and stored in the memory. Then, after vector-matrix multiplication is performed according to the above process, the digital signal is converted into an analog signal through methods such as digital-to-analog conversion. This analog vector-matrix multiplication operation causes greater power consumption and cost overhead, and poor processing performance With the rise of big data applications, the transmission and processing of massive data has further exacerbated these problems.

SUMMARY

In view of this, the embodiment of the present invention provides an analog vector-matrix multiplication circuit to solve the problem of poor processing performance of existing matrix multiplication operations.

In order to achieve the above objective, the present invention adopts the following technical solutions:

An analog vector-matrix multiplication operation circuit includes: a plurality of analog voltage input ends, a programmable semiconductor device array, a plurality of first ends and a plurality of second ends;

In the programmable semiconductor device array, the gates of all programmable semiconductor devices in each row are connected to the same analog voltage input end, a plurality of rows of programmable semiconductor devices are correspondingly connected to a plurality of analog voltage input ends, the drains of all programmable semiconductor devices in each column are connected to the same first end, a plurality of columns of programmable semiconductor devices are correspondingly connected to a plurality of first ends, the sources of all programmable semiconductor devices in each column are connected to the same second end; the plurality of columns of programmable semiconductor devices are correspondingly connected to a plurality of second ends, and the threshold voltage of each programmable semiconductor device can be adjusted;

wherein the first end is the bias voltage input end, and the second end is the analog current output end.

Alternatively, the first end is an analog current output end, and the second end is a bias voltage input end.

In an embodiment, the analog vector-matrix multiplication operation circuit further comprises:

a programming circuit, connected to the source, gate and/or substrate of each programmable semiconductor device in the programmable semiconductor device array, and is used to regulate the threshold voltage of the programmable semiconductor device.

In one embodiment, the programming circuit comprises: a voltage generating circuit and a voltage control circuit, the voltage generating circuit is used to generate a programming voltage or an erase voltage, and the voltage control circuit is used to load the programming voltage to the source of the selected programmable semiconductor device, or load the erase voltage to the gate or substrate of the selected programmable semiconductor device to adjust the threshold voltage of the programmable semiconductor device.

In an embodiment, the analog vector-matrix multiplication operation circuit further comprises:

a controller, connected to the programming circuit, and controls the operation of the programming circuit to control the number of programmable semiconductor devices put into operation and the threshold voltage of each programmable semiconductor device.

In an embodiment, the controller comprises: a row and column decoder, which is used to gate the programmable semiconductor device to be programmed.

In an embodiment, the analog vector-matrix multiplication circuit further comprises: a conversion device, connected to the plurality of analog voltage input ends, used to convert the plurality of analog current input signals into analog voltage input signals, respectively, and output to the corresponding analog voltage input end.

In an embodiment, the conversion device comprises a plurality of programmable semiconductor devices;

The gate of each programmable semiconductor device is connected to the drain and connected to the corresponding analog voltage input end;

The source of each programmable semiconductor device is connected to the first bias voltage.

In an embodiment, the analog vector-matrix multiplication circuit further comprises: a current detection output circuit, connected to the analog current output end, for processing and outputting the analog current output signal output by the analog current output end.

In an embodiment, the current detection output circuit comprises a plurality of operational amplifiers, the non-inverting input end of each operational amplifier is connected to the second bias voltage, and the inverting input end is connected to the corresponding analog current output end, and a resistor or transistor is connected between the inverting input end and the output end.

In one embodiment, the programmable semiconductor device uses floating gate transistors.

The present invention also provides a control method of an analog vector-matrix multiplication circuit, which is used in the above-mentioned analog vector-matrix multiplication circuit, and the control method comprises:

using the controller to control the number of programmable semiconductor devices that are put into operation based on the number of bits required for matrix multiplication;

adjusting the threshold voltage of programmable semiconductor devices through programming circuits;

applying a plurality of analog voltage input signals to the gates of all programmable semiconductor devices in the corresponding row through a plurality of analog voltage input ends;

applying a preset bias voltage to all programmable semiconductor devices in the corresponding column through a plurality of bias voltage input ends;

Obtaining a plurality of analog current output signals, through the plurality of analog current output ends corresponding to the plurality of columns of programmable semiconductor devices.

In an embodiment, before applying a plurality of analog voltage signals to the gates of all programmable semiconductor devices in the corresponding row through the plurality of analog voltage input ends, the control method further comprises:

converting the plurality of analog current input signals respectively into a plurality of analog voltage input signals through the conversion device.

The present invention also provides a storage device comprising the above-mentioned analog vector-matrix multiplication circuit.

The present invention also provides a chip comprising the above-mentioned analog vector-matrix multiplication circuit.

The analog vector-matrix multiplication circuit and control method thereof provided by the present invention can regard each programmable semiconductor device as a variable equivalent analog weight by dynamically adjusting the threshold voltage $V_{TH}$ of each programmable semiconductor device according to a certain rule in advance. It is equivalent to storing an analog data, and the programmable semiconductor device array stores an analog data array; when the circuit is working, a column of analog voltage vectors or a column of analog voltage vectors converted by the analog current vector through the conversion device is applied to the gate of the corresponding programmable semiconductor device, so that the gate of the programmable semiconductor device obtains a voltage signal. The source (or drain) outputs an analog current output signal. According to the characteristics of programmable semiconductor devices, since the sources (or drains) of all programmable semiconductor devices in each column are connected to the same analog current output end, the analog current output signal output by the source (or drain) of each programmable semiconductor device is equal to the voltage multiplied by the weight. According to Kirchhoff's law, the analog current output signal at the analog current output end is the sum of the source (or drain) currents of all programmable semiconductor devices in the column. It is the sum of the product of the gate voltage and the weight of all programmable semiconductor devices in the column. The plurality of analog current output ends output multiple sums of products of gate voltages and weights. So as to realize the function of matrix multiplication operation. The invention utilizes a programmable semiconductor device array to realize analog vector-matrix multiplication. Because programmable semiconductor devices are highly integrated, fast in response, and low in power consumption, the analog vector-matrix multiplication circuit implemented by the programmable semiconductor device array effectively reduces the overhead caused by analog-to-digital conversion, digital-to-analog conversion, data transmission, etc., and its processing performance is improved.

In addition, the analog vector-matrix multiplication circuit provided by the present invention can be used as a flash memory or an electrically erasable programmable read-only memory when the programmable semiconductor device array is in an idle state, which realizes the reuse of electrical components, improves component utilization efficiency, and saves integrated circuit hardware costs.

In addition, the analog vector-matrix multiplication circuit provided by the present invention can accurately process and output the calculated current by setting a current detection output circuit after the analog current output end, or receive the input of the next programmable semiconductor device array. It can effectively improve the output current accuracy.

The storage device provided by the present invention integrates an analog vector-matrix multiplication operation circuit, and directly performs vector-matrix multiplication operations on analog signals in the storage device, without the need to transfer data back and forth between the memory and the processor, which improves processing performance, reduces power consumption and cost overhead.

In order to make the above and other objects, features and advantages of the present invention more comprehensible, the following specifically presents the preferred embodiments, in conjunction with the accompanying drawings, which are described in detail as follows.

BRIEF DESCRIPTION OF THE DRAWINGS

In order to explain the embodiments of the present invention or the technical solutions in the prior art more clearly, the following will briefly introduce the drawings that need to be used in the description of the embodiments or the prior art. Obviously, the drawings in the following description are only some embodiments of the present invention. For those of ordinary skill in the art, other drawings may be obtained from these drawings without creative work.

DETAILED DESCRIPTION

The technical solutions in the embodiments of the present invention will be clearly and completely described below in conjunction with the accompanying drawings in the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

Vector-matrix multiplication is a commonly used logic calculation function, and the performance, power consumption and cost of existing analog vector-matrix multiplication operations need to be improved. The analog vector-matrix multiplication circuit provided by the present invention treats each programmable semiconductor device as a variable equivalent analog weight by adjusting the threshold voltage of the programmable semiconductor device, which is equivalent to analog matrix data. The analog voltage is applied to the programmable semiconductor device array to realize the matrix multiplication function. The circuit structure is simple, the number of components is small, the response speed is fast, and the power consumption is low, which greatly reduces the overhead caused by analog-to-digital conversion, digital-to-analog conversion, and data transmission, and greatly improves processing performance.

Figure 1A:
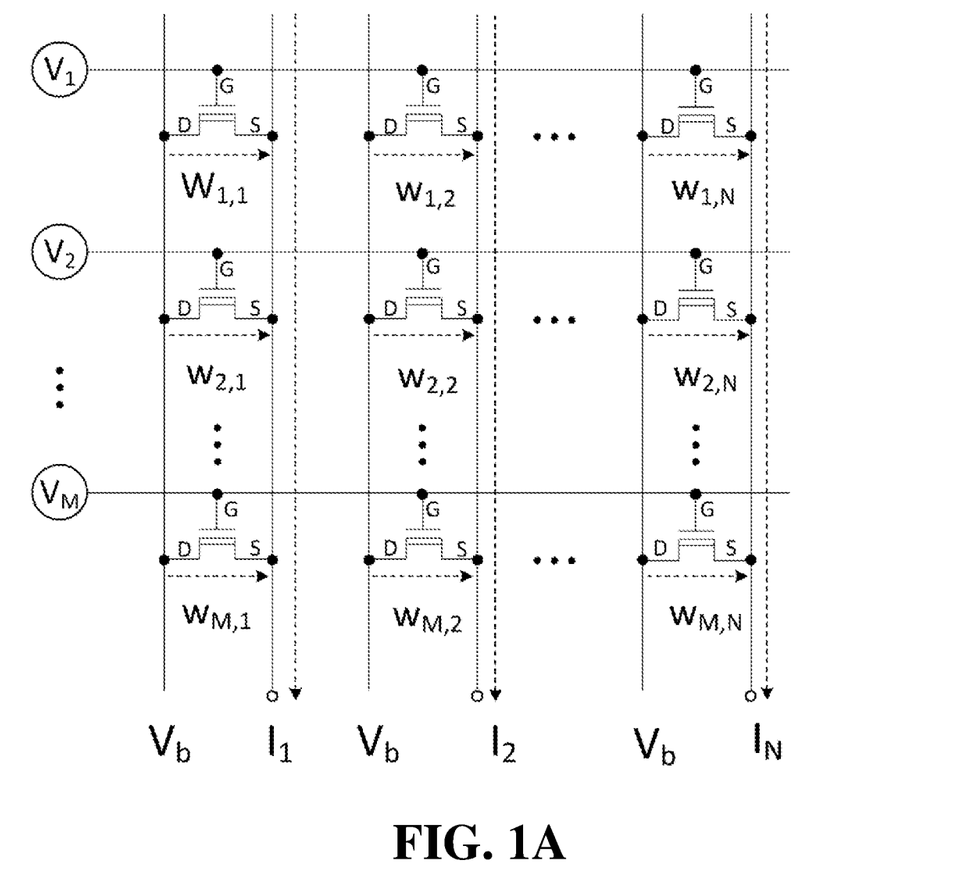
FIG. 1A is a schematic diagram of the first embodiment of the analog vector-matrix multiplication circuit of the present invention.

FIG. 1A is a schematic diagram of the first embodiment of the analog vector-matrix multiplication operation circuit of the present invention. As shown in FIG. 1A, the analog vector-matrix multiplication circuit includes: M analog voltage input ends, a programmable semiconductor device array of M rows and N columns, N first ends and N second ends, where the first end is the bias voltage input end, and the second end is the analog current output end.

In the programmable semiconductor device array, the gates of all programmable semiconductor devices in each row are connected to the same analog voltage input end, M rows of programmable semiconductor devices are correspondingly connected to M analog voltage input ends, the drains of all programmable semiconductor devices in each column are connected to the same bias voltage input end, the N columns of programmable semiconductor devices are correspondingly connected to N bias voltage input ends, the sources of all programmable semiconductor devices in each column are connected to the same analog current output end, and the N columns of programmable semiconductor devices are correspondingly connected to N analog current output ends, wherein, the threshold voltage of each programmable semiconductor device can be adjusted. N is a positive integer greater than or equal to 0, M is a positive integer greater than or equal to 0, M and N can be equal or different.

Through the above circuit connection method, a topological structure of gate coupling and source summation is formed.

Wherein, by dynamically adjusting the threshold voltage $V_{TH}$ of each programmable semiconductor device according to certain rules in advance, each programmable semiconductor device can be regarded as a variable equivalent analog weight (recorded as $W_{k,j}$, where $0<k<M$ and $0<j<N$ represent the row number and column number respectively), It is equivalent to storing an analog data, and the programmable semiconductor device array stores an analog data array $$\begin{bmatrix} W_{1,1} & \ldots & \ldots & W_{1,N} \\ \ldots & \ldots & \ldots & \ldots \\ \ldots & \ldots & \ldots & \ldots \\ W_{M,1} & \ldots & \ldots & W_{M,N} \end{bmatrix}.$$

When the circuit is working, a column of analog voltage signals $V_1 \sim V_M$ are respectively applied to the M rows of programmable semiconductor devices, wherein the gates of all programmable semiconductor devices in row K get an analog voltage signal $V_k$, the drain inputs a bias voltage $V_b$, and the sources output current signals $I_{k,1} \sim I_{k,N}$ respectively. According to the characteristics of programmable semiconductor devices $I=V \times W$, the source output current of each programmable semiconductor device is equal to the gate voltage multiplied by the weight of the programmable semiconductor device, i.e. $I_{k,1}=V_k W_{k,1}$, $I_{k,N}=V_k W_{k,N}$. Since the sources of all programmable semiconductor devices in each column are connected to the same analog current output end, according to Kirchhoff's law, the current at the analog current output end is the sum of the source currents of all programmable semiconductor devices in the column, i.e. $I_j=\Sigma_{k=1}^{M} V_k W_{k,j}$. Multiple analog current output ends output multiple current sums ($\Sigma_{k=1}^{M} V_k W_{k,1}$, $\Sigma_{k=1}^{M} V_k W_{k,2}$, $\Sigma_{k=1}^{M} V_k W_{k,3}$ ... $\Sigma_{k=1}^{M} V_k W_{k,N}$) to realize the function of matrix multiplication.

The invention utilizes a programmable semiconductor device array to realize analog vector-matrix multiplication. Since programmable semiconductor devices have high integration, fast response speed, and low power consumption, the analog vector-matrix multiplication circuit implemented by programmable semiconductor devices effectively reduces the overhead caused by analog-to-digital conversion, digital-to-analog conversion, and data transmission. Its processing performance is greatly improved.

Figure 1B:
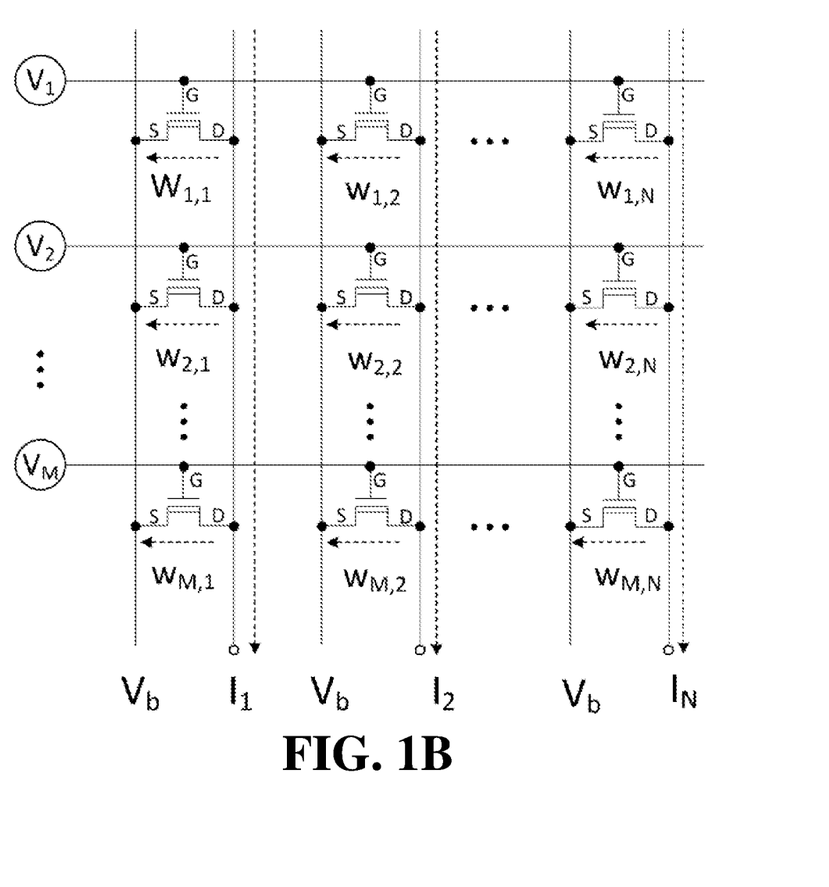
FIG. 1B is a schematic diagram of the second embodiment of the analog vector-matrix multiplication operation circuit of the present invention.

FIG. 1B is a schematic diagram of the second embodiment of the analog vector-matrix multiplication operation circuit of the present invention. As shown in FIG. 1B, the analog vector-matrix multiplication circuit includes: M analog voltage input ends, a programmable semiconductor device array with M rows and N columns, N first ends and N second ends, where the first end is the analog current output end, and the second end is the bias voltage input end.

In the programmable semiconductor device array, the gates of all programmable semiconductor devices in each row are connected to the same analog voltage input end, the M rows of programmable semiconductor devices are correspondingly connected to M analog voltage input ends, the sources of all programmable semiconductor devices in each column are connected to the same bias voltage input end, N columns of programmable semiconductor devices are correspondingly connected to N bias voltage input ends, drains of all programmable semiconductor devices in each column are connected to the same analog current output end, N columns of programmable semiconductor devices are correspondingly connected to N analog current output ends, wherein, the threshold voltage of each programmable semiconductor device can be adjusted. N is a positive integer greater than or equal to 0, M is a positive integer greater than or equal to 0, M and N can be equal or different.

Through the above circuit connection method, a topological structure of gate coupling and drain summation is formed.

Wherein, by dynamically adjusting the threshold voltage $V_{TH}$ of each programmable semiconductor device according to certain rules in advance, each programmable semiconductor device can be regarded as a variable equivalent analog weight (recorded as $W_{k,j}$, where $0<k<M$ and $0<j<N$ represent the row number and column number respectively). It is equivalent to storing an analog data, and the programmable semiconductor device array stores an analog data array $$\begin{bmatrix} w_{1,1} & \ldots & \ldots & w_{1,N} \\ \ldots & \ldots & \ldots & \ldots \\ \ldots & \ldots & \ldots & \ldots \\ w_{M,1} & \ldots & \ldots & w_{M,N} \end{bmatrix}.$$

When the circuit is working, a column of analog voltage signals $V_1 \sim V_M$ are respectively applied to the M rows of programmable semiconductor devices, wherein the gates of all programmable semiconductor devices in row K get an analog voltage signal $V_k$, the source inputs a bias voltage $V_b$, and the drain output current signals $I_{k,1} \sim I_{k,N}$ respectively. According to the characteristics of programmable semiconductor devices I=V×W, the drain output current of each programmable semiconductor device is equal to the gate voltage multiplied by the weight of the programmable semiconductor device, i.e. $I_{k,1}=V_k W_{k,1}, I_{k,N}=V_k W_{k,N}$. Since the drain of all programmable semiconductor devices in each column are connected to the same analog current output end, according to Kirchhoff's law, the current at the analog current output end is the sum of the drain currents of all programmable semiconductor devices in the column, i.e. $I_j=\Sigma_{k=1}^{M}V_k W_{kj}$. Multiple analog current output ends output multiple current sums ($\Sigma_{k=1}^{M}V_k W_{k,1}$, $\Sigma_{k=1}^{M}V_k W_{k,2}$, $\Sigma_{k=1}^{M}V_k W_{k,3}$ . . . $\Sigma_{k=1}^{M}V_k W_{k,N}$) to realize the function of matrix multiplication.

The invention utilizes a programmable semiconductor device array to realize analog vector-matrix multiplication. Since programmable semiconductor devices have high integration, fast response speed, and low power consumption, the analog vector-matrix multiplication circuit implemented by programmable semiconductor devices effectively reduces the overhead caused by analog-to-digital conversion, digital-to-analog conversion, and data transmission. Its processing performance is greatly improved.

In addition, since the gate-source voltage of the programmable semiconductor device determines the output current of the programmable semiconductor device, the output current of the programmable semiconductor device is very sensitive to the source voltage, which may cause calculation errors. However, this embodiment adopts the topological structure of gate coupling and drain summation. Even if the source voltage fluctuates, calculation errors will not be caused, and the calculation accuracy can be improved.

Figure 2:
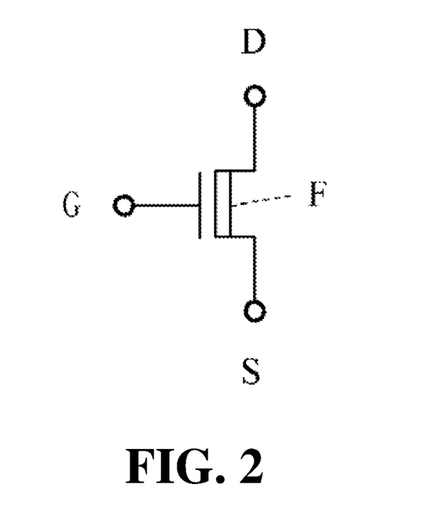
FIG. 2 is a structural diagram of a floating gate transistor in an analog vector-matrix multiplication circuit according to an embodiment of the present invention.

In the first embodiment or the second embodiment, optionally, the programmable semiconductor device may be implemented by a floating gate transistor, and the structure of the floating gate transistor is shown in FIG. 2. The floating gate transistor includes a substrate, an insulating layer, a gate G, a source S, a drain D, and a floating gate F. The floating gate is arranged between the gate and the insulating layer, and the insulating layer is arranged between the floating gate and the substrate to protect the electrons in the floating gate from leaking, and the floating gate can store electrons. By adjusting the number of electrons in the floating gate, the threshold voltage of the floating gate transistor is dynamically adjusted. Due to the structural characteristics of the floating gate transistor, it can be regarded as a variable equivalent analog weight to store an analog data.

Figure 1C:
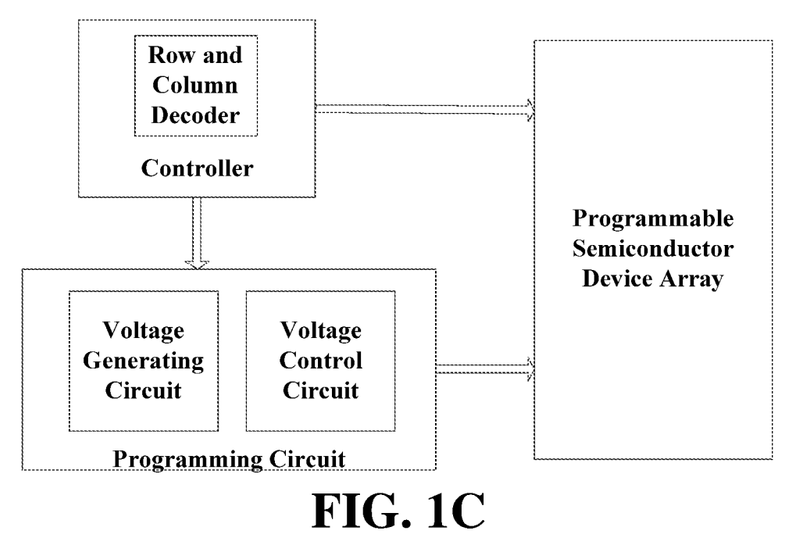
FIG. 1C is a schematic diagram of apparatus for regulating the threshold voltage for each of the programmable semiconductor device of the analog vector-matrix multiplication circuit of the present invention.

In the first embodiment or the second embodiment, optionally, the analog vector-matrix multiplication circuit may further include:

the programming circuit is connected to the source, gate and/or substrate of each programmable semiconductor device in the programmable semiconductor device array, and is used to regulate the threshold voltage of the programmable semiconductor device.

Preferably, the programming circuit includes a voltage generating circuit and a voltage control circuit, the voltage generating circuit is used to generate a programming voltage or an erase voltage, and the voltage control circuit is used to load the programming voltage to the source of the selected programmable semiconductor device. Alternatively, the erase voltage is applied to the gate or the substrate of the selected programmable semiconductor device to adjust the threshold voltage of the programmable semiconductor device.

Specifically, the programming circuit uses the hot electron injection effect to apply a high voltage to the source of the programmable semiconductor device according to the threshold voltage requirement data of the programmable semiconductor device to accelerate the channel electrons to a high speed to increase the threshold voltage of the programmable semiconductor device.

In addition, the programming circuit uses the tunneling effect to apply a high voltage to the gate or substrate of the programmable semiconductor device according to the threshold voltage requirement data of the programmable semiconductor device, thereby reducing the threshold voltage of the programmable semiconductor device.

In the first embodiment or the second embodiment, optionally, the analog vector-matrix multiplication operation circuit may further include:

The controller is connected to the programming circuit, and by controlling the operation of the programming circuit, the number of programmable semiconductor devices put into operation and the threshold voltage of each programmable semiconductor device are adjusted to meet the requirements of matrix multiplication.

Preferably, the controller includes a row and column decoder for gating the programmable semiconductor device to be programmed.

In the first embodiment or the second embodiment, optionally, the analog vector-matrix multiplication circuit may further include: a bias voltage generating circuit for generating a preset bias voltage and inputting it to the bias voltage input end. It can be understood that the analog vector-matrix multiplication circuit may not be provided with a bias voltage generating circuit. By multiplexing the voltage generating circuit in the programming circuit, the voltage generating circuit is controlled to generate a preset bias voltage, which is input to the bias voltage input end.

Figure 3A:
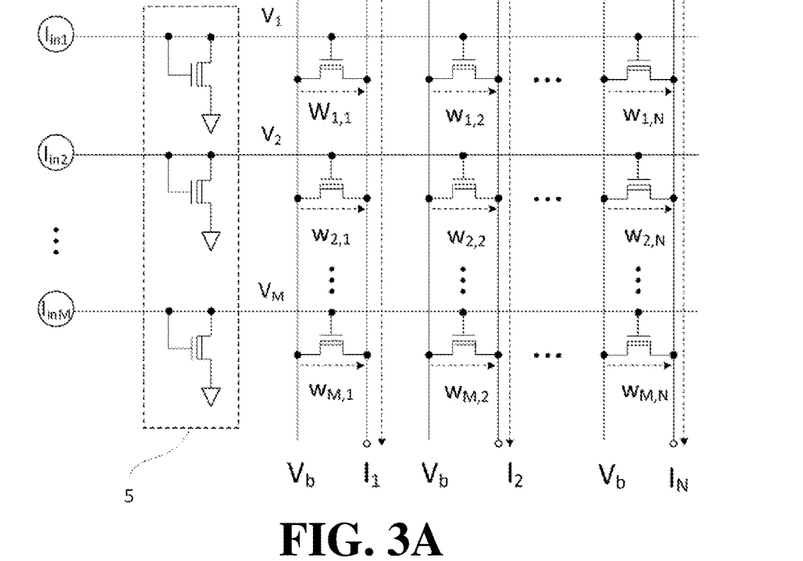
FIG. 3A is a schematic diagram of a third embodiment of the analog vector-matrix multiplication operation circuit of the present invention.

FIG. 3A is a schematic diagram of a third embodiment of the analog vector-matrix multiplication circuit of the present invention. The analog vector-matrix multiplication circuit includes all the contents in the first embodiment shown in FIG. 1A or the second embodiment shown in FIG. 1B, and may further include: a conversion device 5, which is connected before the plurality of analog voltage input ends, and is used to convert the plurality of analog current input signals into analog voltage input signals, and output them to the corresponding analog voltage input ends.

In an alternative embodiment, the conversion device 5 includes a plurality of programmable semiconductor devices.

The gate and drain of each programmable semiconductor device are connected to the corresponding analog voltage input end.

The source of each programmable semiconductor device is connected to the first bias voltage.

It can be understood that the first bias voltage to which the source is connected may be a ground voltage, that is, the source is grounded.

In this embodiment, the gate and drain of each programmable semiconductor device are connected to receive an analog current input signal.

Optionally, the programmable semiconductor device in the conversion device 5 may be a floating gate transistor.

When the circuit is working, a row of analog current input signals $I_{in1} \sim I_{inM}$ is converted into a row of analog voltage input signals $V_1 \sim V_M$ by the conversion device 5 and then applied to the M rows of programmable semiconductor devices. By providing the conversion device, the analog vector-matrix multiplication circuit in the embodiment of the present invention is not only suitable for analog voltage input signals, but also suitable for analog current input signals, which can increase the applicability of the analog vector-matrix multiplication circuit.

Figure 3B:
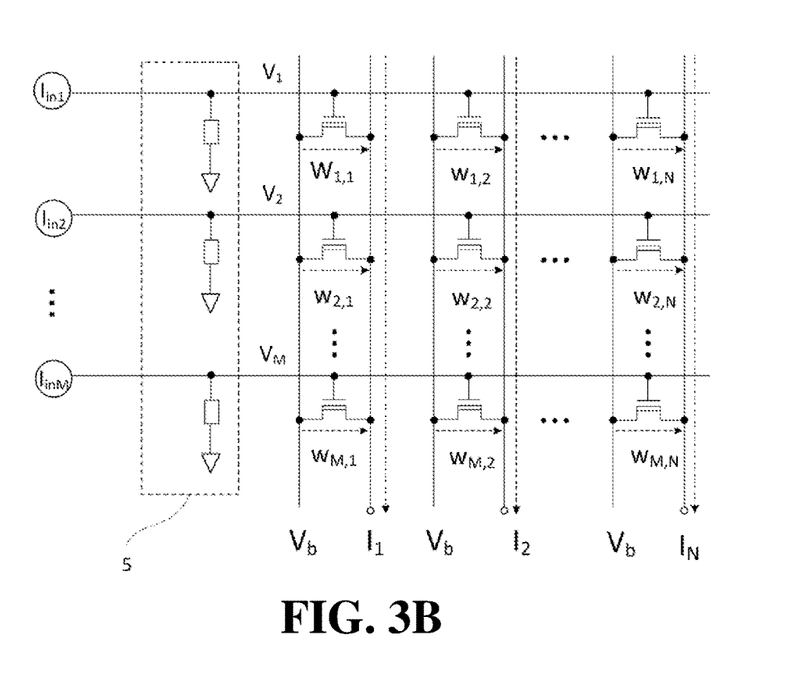
FIG. 3B is a schematic diagram of a fourth embodiment of the analog vector-matrix multiplication operation circuit of the present invention.

FIG. 3B is a schematic diagram of the fourth embodiment of the analog vector-matrix multiplication circuit of the present invention. The analog vector-matrix multiplication circuit includes all the contents in the first embodiment shown in FIG. 1A or the second embodiment shown in FIG. 1B, and further include: a conversion device 5, which is connected before the plurality of analog voltage input ends, and is used to convert the plurality of analog current input signals into analog voltage input signals, and output them to the corresponding analog voltage input ends.

In an optional embodiment, the conversion device 5 includes a plurality of resistors, and the plurality of resistors are connected to the plurality of analog voltage input ends in a one-to-one correspondence.

One end of each resistor is connected to the corresponding analog voltage input end, and the other end is connected to the first bias voltage. It is understood that the first bias voltage may be a ground voltage, that is, the other end of the resistor is grounded.

When the circuit is working, a row of analog current input signals $I_{in1} \sim I_{inM}$ is converted into a row of analog voltage input signals $V_1 \sim V_M$ by the conversion device 5 and then applied to the M rows of programmable semiconductor devices.

By providing the conversion device, the analog vector-matrix multiplication circuit in the embodiment of the present invention is not only suitable for analog voltage input signals, but also suitable for analog current input signals, which can increase the applicability of the analog vector-matrix multiplication circuit.

It is worth noting that the implementation of the conversion device described above is just an example. Any circuit structure or circuit element that can convert a current input signal into a voltage input signal can be used to implement the conversion device, such as a metal semiconductor field effect transistor.

Figure 4:
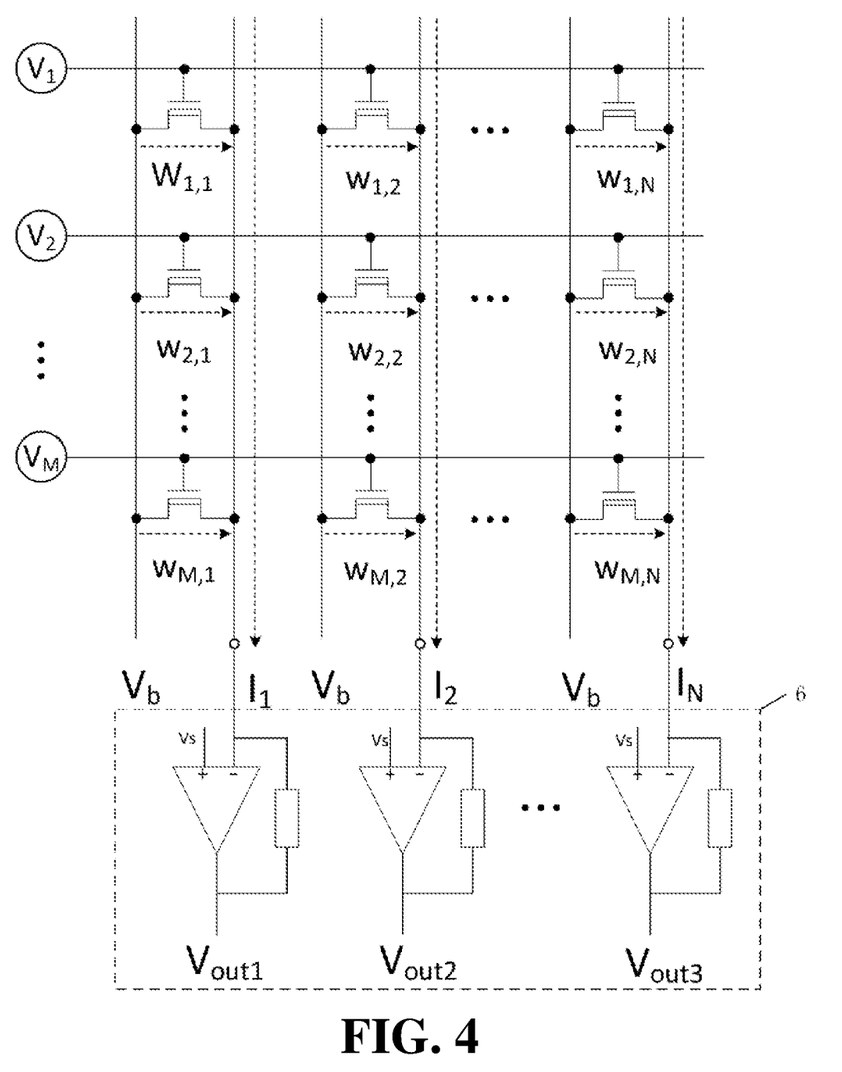
FIG. 4 is a schematic diagram of a fifth embodiment of the analog vector-matrix multiplication operation circuit of the present invention.

FIG. 4 is a schematic diagram of a fifth embodiment of the analog vector-matrix multiplication circuit of the present invention. As shown in FIG. 4, the analog vector-matrix multiplication circuit includes all the contents described in any one of the first embodiment to the fourth embodiment, and further include: a current detection output circuit 6, after being connected to the analog current output end, for processing and outputting the analog current output signal output by the analog current output end.

Wherein, the calculated current is accurately processed and output by the current detection output circuit, or the input of the next programmable semiconductor array is received, which can effectively achieve accurate current output.

Wherein, the calculated current is accurately processed and output through the current detection output circuit, or input into the next programmable semiconductor array, which can effectively achieve accurate current output.

In an alternative embodiment, the current detection output circuit may include a plurality of operational amplifiers, the non-inverting input end of each operational amplifier is connected to the second bias voltage Vs, and the inverting input end is connected to the corresponding analog current output end. In addition, a resistor or transistor is connected between the inverting input end and the output end.

Wherein, the positive-phase input end is generally grounded, and the operational amplifier controls the voltage at the analog current output end to be equal to the voltage at the positive-phase input end. It is used to ensure that the gate-source voltage $V_{GS}$ of the programmable semiconductor device is only controlled by the input voltage corresponding to the programmable semiconductor device, so that the output end voltage of the operational amplifier represents the magnitude of the output current of the programmable semiconductor device of the corresponding column.

The foregoing is only an example to illustrate the specific structure of each module in the analog vector-matrix multiplication circuit provided by the embodiment of the present invention. In specific implementation, the specific structure of each of the foregoing modules is not limited to the foregoing structure provided in the embodiment of the present invention, and may also be other structures known to those skilled in the art, which is not limited herein.

The embodiment of the present application also provides a control method of an analog vector-matrix multiplication circuit, which can be used to control the analog vector-matrix multiplication circuit described in the foregoing embodiments, as described in the following embodiments. Since the principle of the control method to solve the problem is similar to the above-mentioned circuit, the implementation of the control method can refer to the implementation of the above-mentioned circuit, and the repetition will not be repeated.

Figure 5:
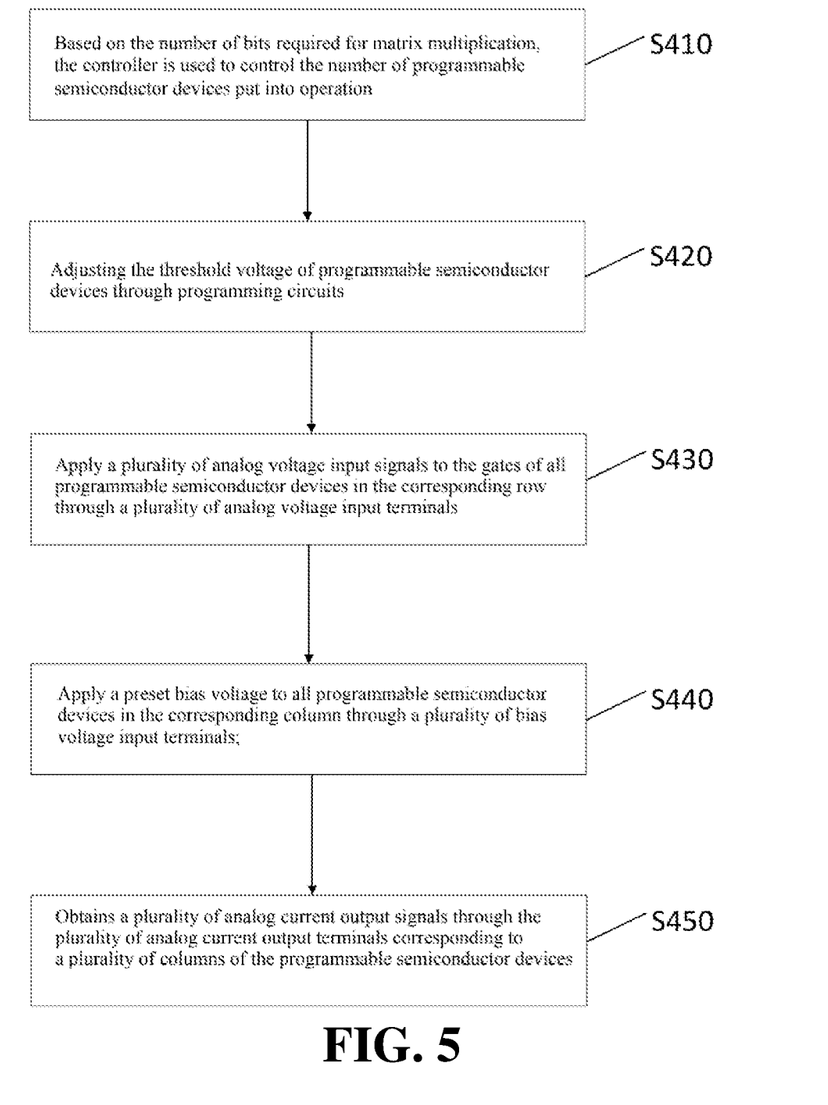
FIG. 5 is a flowchart of a control method of an analog vector-matrix multiplication circuit according to an embodiment of the present invention.

The control method of the analog vector-matrix multiplication circuit is shown in FIG. 5, which is used to control the above-mentioned analog vector-matrix multiplication circuits. The control method includes:

Step S430: Applying a plurality of analog voltage input signals to the gates of all programmable semiconductor devices in the corresponding row through a plurality of analog voltage input ends.

Step S440: Applying a preset bias voltage to all programmable semiconductor devices in the corresponding column through a plurality of bias voltage input ends.

Wherein, in this step, when the analog vector-matrix multiplication circuit adopts the topological structure of gate coupling and source summation, the preset bias voltage is applied to the drain of the programmable semiconductor device; when the analog vector-matrix multiplication circuit adopts the topological structure of gate coupling and drain summation, the preset bias voltage is applied to the source of the programmable semiconductor device.

Step S450: Obtaining a plurality of analog current output signals through a plurality of analog current output ends corresponding to the plurality of columns of programmable semiconductor devices.

Optionally, if the input signal is an analog current input signal, the conversion device 5 first converts the plurality of analog current input signals into a plurality of analog voltage input signals, then input the analog voltage input signal to the analog voltage input end for matrix-multiplication.

Optionally, the analog current output signal obtained in each column is: the product of the analog voltage input signal of each row connected to the column and the weight of each programmable semiconductor device in the column is then summed.

Preferably, the control method of the analog vector-matrix multiplication operation circuit further includes:

Step S420: Adjusting the threshold voltage of the programmable semiconductor device through the programming circuit.

Preferably, the control method further includes:

Step S410: Based on the number of bits required for the matrix multiplication operation, the controller is used to control the number of programmable semiconductor devices put into operation.

The embodiment of the present invention also provides a storage device including the above-mentioned analog vector-matrix multiplication circuit. The storage device integrates an analog vector-matrix multiplication operation circuit, which directly performs vector-matrix multiplication operations on analog signals in the storage device, and does not need to transfer data back and forth between the memory and the processor. Improve processing performance, reduce power consumption and cost overhead.

Preferably, the storage device is a flash memory or an electrically erasable programmable read-only memory.

Preferably, the flash memory is a NOR flash memory.

The embodiment of the present invention also provides a chip including the above-mentioned analog vector-matrix multiplication circuit.

By adjusting the threshold voltage of programmable semiconductor devices, each programmable semiconductor device is regarded as a variable equivalent analog weight, which is equivalent to analog matrix data. The analog voltage is applied to the programmable semiconductor device array to realize the matrix multiplication function. The circuit structure is simple, the number of components is small, the response speed is fast, and the power consumption is low, which greatly reduces the overhead caused by analog-to-digital conversion, digital-to-analog conversion, and data transmission, and effectively improve the processing performance of the arithmetic circuit.

In addition, the analog vector-matrix multiplication circuit provided by the present invention can be used as a flash memory or an electrically erasable programmable read-only memory when the programmable semiconductor device array is in an idle state, which realizing the reuse of electrical components, improving component utilization efficiency, and saving integrated circuit hardware costs.

The storage device provided by the present invention integrates an analog vector-matrix multiplication operation circuit, and directly performs vector-matrix multiplication operations on analog signals in the storage device. There is no need to transfer data back and forth between the memory and the processor, which improves processing performance and reduces power consumption and cost overhead.

Specific examples are used in the present invention to explain the principle and implementation of the present invention. The description of the above embodiments is only used to help understand the method and core idea of the present invention. At the same time, for those of ordinary skill in the art, according to the idea of the present invention, there will be changes in the specific implementation and the scope of application. In summary, the content of this specification should not be construed as limiting the present invention.

What is claimed:

1. An analog vector-matrix multiplication operation circuit, characterized by comprising: a plurality of analog voltage input ends, a programmable semiconductor device array, a plurality of first ends and a plurality of second ends;

in the programmable semiconductor device array, gates of all programmable semiconductor devices in each row are connected to the same analog voltage input end, a plurality of rows of the programmable semiconductor devices are correspondingly connected to the plurality of analog voltage input ends, for respectively inputting a column of analog voltage signals $V_1 \sim V_M$ at the same time, wherein the gates of all programmable semiconductor devices in each row get one of the analog voltage signals, drains of all programmable semiconductor devices in each column are connected to a same first end, a plurality of columns of programmable semiconductor devices are correspondingly connected to the plurality of first ends, sources of all programmable semiconductor devices in each column are connected to a same second end, the plurality of columns of programmable semiconductor devices are correspondingly connected to the plurality of second ends, and a threshold voltage of each programmable semiconductor device can be adjusted by dynamically adjusting the threshold voltage of each programmable semiconductor device in advance, a variable equivalent analog weight is stored in each programmable semiconductor device, so as to store an analog data array in the programmable semiconductor device array;

wherein, the same first end is a bias voltage input end, and the same second end is an analog current output end; or the same first end is an analog current output end, and the same second end is a bias voltage input end;

a current detection output circuit connected to the analog current output end and used to process and output an analog current output signal output by the analog current output end.

2. The analog vector-matrix multiplication operation circuit according to claim 1, further comprising:

a programming circuit which is connected to a source, a gate and/or a substrate of each programmable semiconductor device in the programmable semiconductor device array, and is used to regulate the threshold voltage for each of the programmable semiconductor device.

3. The analog vector-matrix multiplication circuit according to claim 2, wherein the programming circuit comprises: a voltage generating circuit and a voltage control circuit, the voltage generating circuit is used to generate a programming voltage or an erase voltage, and the voltage control circuit is used to load the programming voltage to the source of a selected programmable semiconductor device; or apply the erase voltage to the gate or the substrate of the selected programmable semiconductor device to adjust the threshold voltage for each of the programmable semiconductor device.

4. The analog vector-matrix multiplication operation circuit according to claim 3, further comprising:
a controller connected to the programming circuit, and controlling a number of programmable semiconductor devices put into operation and the threshold voltage of each programmable semiconductor device by controlling an operation of the programming circuit.

5. The analog vector-matrix multiplication circuit according to claim 4, wherein the controller comprises: a row and column decoder for gating a programmable semiconductor device to be programmed.

6. The analog vector-matrix multiplication operation circuit according to claim 1, further comprising: a conversion device connected to the plurality of analog voltage input ends, and used to convert a plurality of analog current input signals into analog voltage input signals respectively, and output the analog voltage input signals to the corresponding analog voltage input ends.

7. The analog vector-matrix multiplication circuit according to claim 6, wherein the conversion device comprises a plurality of programmable semiconductor devices;
a gate of each programmable semiconductor device is connected to a drain of each programmable semiconductor device, and is connected to the corresponding analog voltage input end;
a source of each programmable semiconductor device is connected to a first bias voltage.

8. The analog vector-matrix multiplication circuit according to claim 1, wherein the current detection output circuit comprises: a plurality of operational amplifiers, a non-inverting input end of each operational amplifier is connected to a second bias voltage, and a inverting input end of each operational amplifier is connected to the corresponding analog current output end, and a resistor or transistor is connected between an inverting input end and an output end.

9. A control method of analog vector-matrix multiplication circuit, characterized by being applied to the analog vector-matrix multiplication circuit of any one of claims 1-7, and 8, the control method comprising:
applying the plurality of analog voltage input signals to the gates of all programmable semiconductor devices in the corresponding row through the plurality of analog voltage input ends;
applying a preset bias voltage to all programmable semiconductor devices in the corresponding column through the plurality of bias voltage input ends;
obtaining the plurality of analog current output signals through the plurality of analog current output ends corresponding to the plurality of columns of programmable semiconductor devices;
wherein, if an input signal of the analog vector-matrix multiplication circuit is an analog current input signal, the control method further includes:
the plurality of analog current input signals are respectively converted into the plurality of analog voltage input signals through a conversion device.

10. The control method of an analog vector-matrix multiplication operation circuit according to claim 9, further comprising:
the threshold voltage of the programmable semiconductor device is regulated by a programming circuit.

11. The control method of an analog vector-matrix multiplication operation circuit according to claim 9, further comprising:
based on a number of bits required for matrix multiplication, a controller is used to control a number of programmable semiconductor devices that are put into operation.

12. A storage device, characterized by comprising the analog vector-matrix multiplication circuit of any one of claims 1-7 and 8.

13. A chip, characterized by comprising the analog vector-matrix multiplication circuit of any one of claims 1-7 and 8.

* * * * *